(12) United States Patent  (10) Patent No.: US 8,141,666 B2
Ganiere  (45) Date of Patent: Mar. 27, 2012

(54) SOLAR POWERED AIRPORT BAGGAGE CART

(76) Inventor: Jeff Ganiere, Tarpon Springs, FL (US)

( * ) Notice: Subject to any disclaimer, the term of this patent is extended or adjusted under 35 U.S.C. 154(b) by 192 days.

(21) Appl. No.: 12/758,215

(22) Filed: Apr. 12, 2010

(65) Prior Publication Data

US 2011/0247885 A1    Oct. 13, 2011

(51) Int. Cl.
*B60L 8/00* (2006.01)
(52) U.S. Cl. ........................ 180/2.2; 180/65.31; 60/641.8
(58) Field of Classification Search .................... 180/2.2, 180/65.31, 65.51, 305, 307; 60/641.8, 641.1
See application file for complete search history.

(56) References Cited

U.S. PATENT DOCUMENTS

| | | | |
|---|---|---|---|
| 7,338,335 B1 * | 3/2008 | Messano | 180/65.22 |
| 2009/0242284 A1 * | 10/2009 | Whetstone, Jr. | 180/19.2 |
| 2009/0250901 A1 * | 10/2009 | Lundin | 280/442 |

\* cited by examiner

*Primary Examiner* — J. Allen Shriver, II
*Assistant Examiner* — James Triggs
(74) *Attorney, Agent, or Firm* — Dennis G. LaPointe

(57) ABSTRACT

A solar powered baggage cart that includes a baggage container portion, an operator platform, front wheels and rear wheels underlying the baggage cart for supporting, and an array of photo-voltaic cells located in an overlying relationship to the container. The cells are in electrical communication with a bank of batteries through a charging control circuit for charging the batteries, which are mounted under the baggage cart and are electrically connected to one or more electric motor/pumps. The electric motor/pumps are in mechanical communication with respective drive motors and brakes for the front and rear wheels. The baggage cart is configured to steer in one of three modes, a front wheel steer mode, a rear wheel assist steer mode or a crab steer mode.

10 Claims, 5 Drawing Sheets

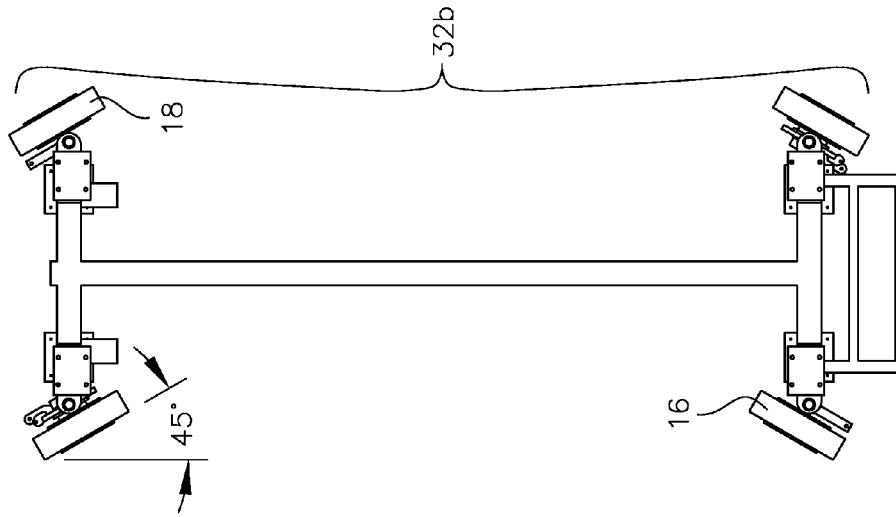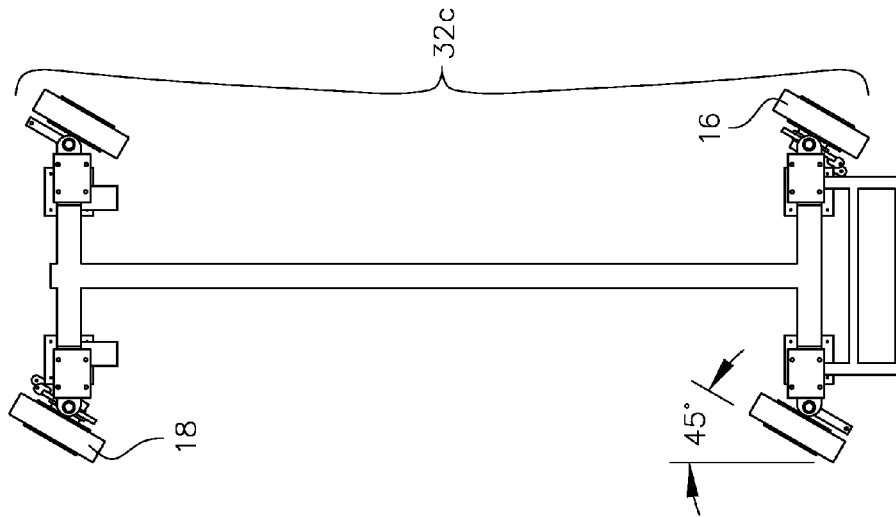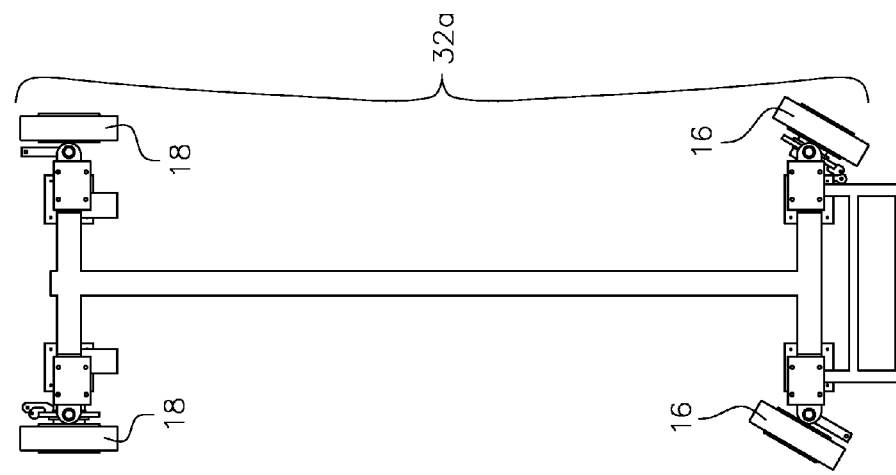

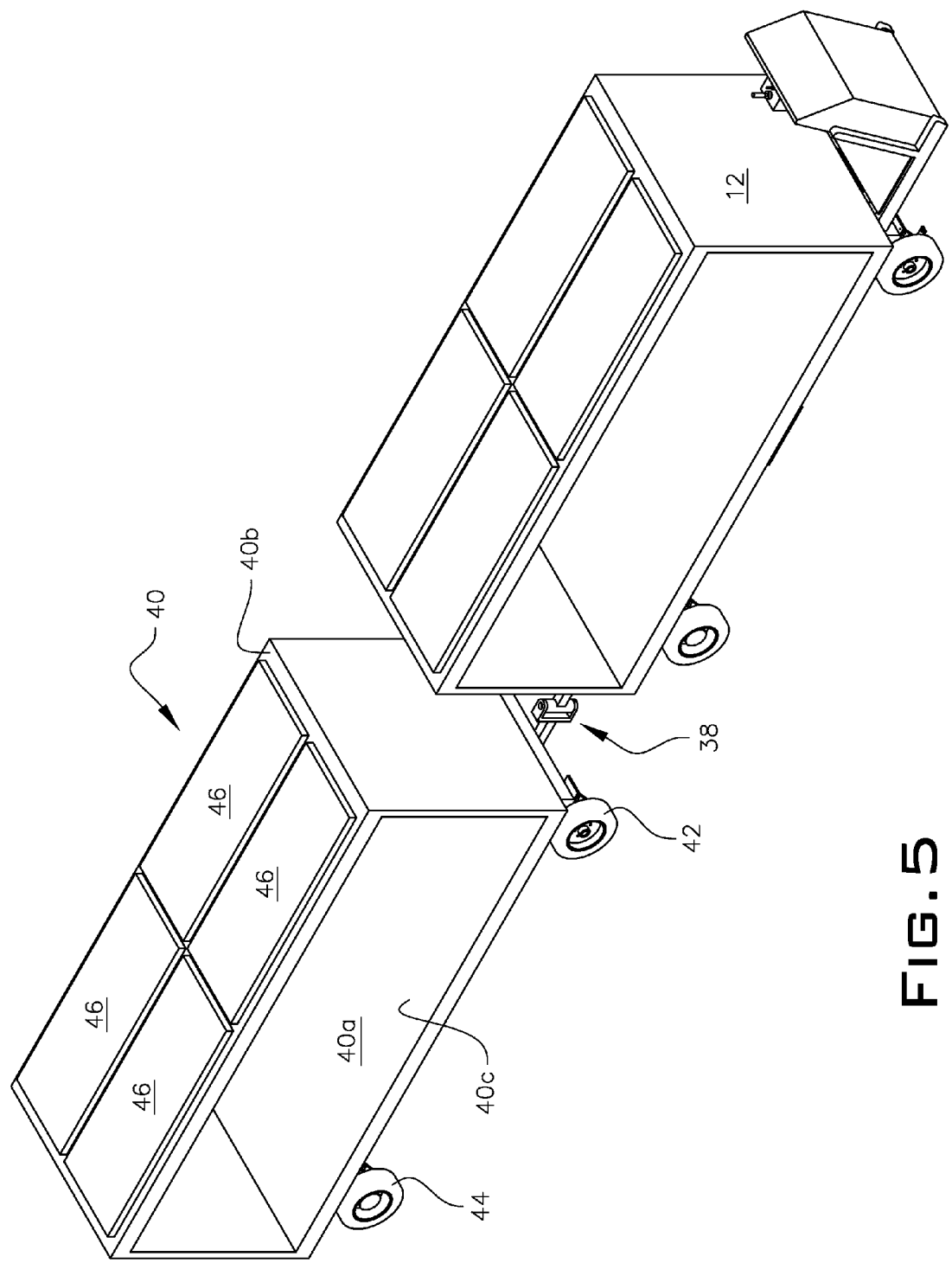

SOLAR POWERED AIRPORT BAGGAGE CART

FIELD OF THE INVENTION

The invention relates to baggage carts used at airports, in particular, to solar powered baggage carts suitable for use in small airports where the aircraft is typically within a few hundred yards from the baggage room conveyor system.

BACKGROUND OF THE INVENTION

The commercial aviation industry has been obliged to carry each passenger's luggage along with the passenger to the same destination as the passenger since the beginning of commercial aviation. Typically, the baggage is carried in baggage compartments located in the belly of the aircraft. Baggage checked in at the ticket counter is transported via a conveyor to an area near the aircraft and then manually loaded onto baggage carts that are towed by a special use baggage tug to the aircraft for loading onto the aircraft. Conversely, arriving flights must unload baggage from the aircraft onto baggage carts and then the baggage carts are towed to the baggage conveyor and transported via conveyor to the baggage claim area.

The baggage carts used are generally of the same shape and very little difference in size. Most have a baggage container that is approximately 5 feet high, 5 feet wide and ten or twelve feet long. The containers are set on four wheels, two of them are steering wheels that attach to a tow bar. When the tow bar is in the UP position, a mechanical friction brake is set to keep the cart from rolling away due to ramp inclines or wind. Some carts are covered and some are not. The baggage tow vehicles are designed for the sole purpose of pulling baggage carts. They are powered by internal combustion engines. At many large airports where the airline has many gates, tow vehicles are required to pull baggage carts long distances in the commission of transferring baggage on connecting flights. There are, however, hundreds of airports in the United States where airlines provide service that have only one or two gates. Therefore, the complexity and distances that baggage must be transferred is greatly reduced. However, the equipment for moving baggage remains the same. Therefore, a baggage tow vehicle has to be started, driven for less than a minute and then shut off. There are a few disagreeable aspects to running a tow vehicle for such a short time. 1) The engine burns a disproportionately high amount of fuel until the engine is warmed up, but the engine is never run long enough for it to warm up. Consequently unburned fuel, rich in contaminates is dumped into the atmosphere. 2) Engines not allowed to run at normal operating temperature have a very short life span. Where an engine should be good for several thousands of hours running time, engines only run cold may have a life span as short as 100 hours. Tow vehicles cannot be left to run and warm up properly because all vehicles on the tarmac must be manned to eliminate the possibility of a run-away vehicle.

The present invention offers a solution to the inherent problems of internal combustion powered vehicles needed for short runs and intermittent service.

SUMMARY OF THE INVENTION

The baggage cart of the present invention is designed to meet baggage transfer requirements when the distance between the aircraft and the baggage conveyor system is typically less than a few hundred feet, such as at small airports with 6-12 flights per day. It is not meant for continuous all day runs such as at larger airport hubs.

It has true track steering capabilities preferably using a steering device such as a device formed as a joystick. The steering mechanism is configured so that the cart simply goes in the same direction that steering device is pointed and the cart automatically comes to a stop with brakes set as soon as the joystick is released. Further, when the joystick is released, the wheels return to a center straight line orientation.

The cart has wheels that can allow the cart to rotate a full 360 degrees turn in its own length. In a preferred embodiment, there are two steering modes: 1) rear wheel assist steering where all four wheels turn to facilitate sharp turns; 2) Side shuttle steering left or right where all four wheels turn to a 45 degree angle and when the joystick is pushed forward or back at the 45 degree angle from center, the cart goes sideways in the desired direction.

In a preferred embodiment, the cart incorporates internal motorized brakes that provide positive braking to ensure that the cart will not move while unattended.

The cart is designed to allow for a 6000 pound capacity in a 5 foot by 5 foot by 12 foot container and can handle at least one additional baggage cart. Overlying the top of the container forming the baggage cart is an array of photo voltaic cells that produce about 750 watts of solar power to keep the batteries charged to capacity. Obviously, the preferred embodiment is to incorporate an electric source of power for the cart using batteries that are charged by the solar cells. Optionally, a 110 volt AC receptacle is also provided for charging the batteries when needed or when sun exposure is limited. A battery gauge is located in the console to indicate battery charge state.

Optionally, a gas engine/generator system may be incorporated in the cart system as an alternative method of charging the batteries of the cart. Wheels preferably comprise 4 inch by 16 inch solid rubber material and lube-free sealed king pin bearings. As an electric operated solar powered cart, the cart never needs oil changes, lubrication, or filters and carries a relative large payload with a rapid financial payback.

BRIEF DESCRIPTION OF THE DRAWINGS

In the accompanying drawings:

FIG. 4A is a representational schematic depicting a two wheel steering mode;

FIG. 4B is a representational schematic depicting a crab steering mode;

FIG. 4C is a representational schematic depicting a rear wheel assist steering mode; and FIG. 5 is a conceptual representation of the invention towing a tow cart.

DETAILED DESCRIPTION OF THE INVENTION

Figure 1:
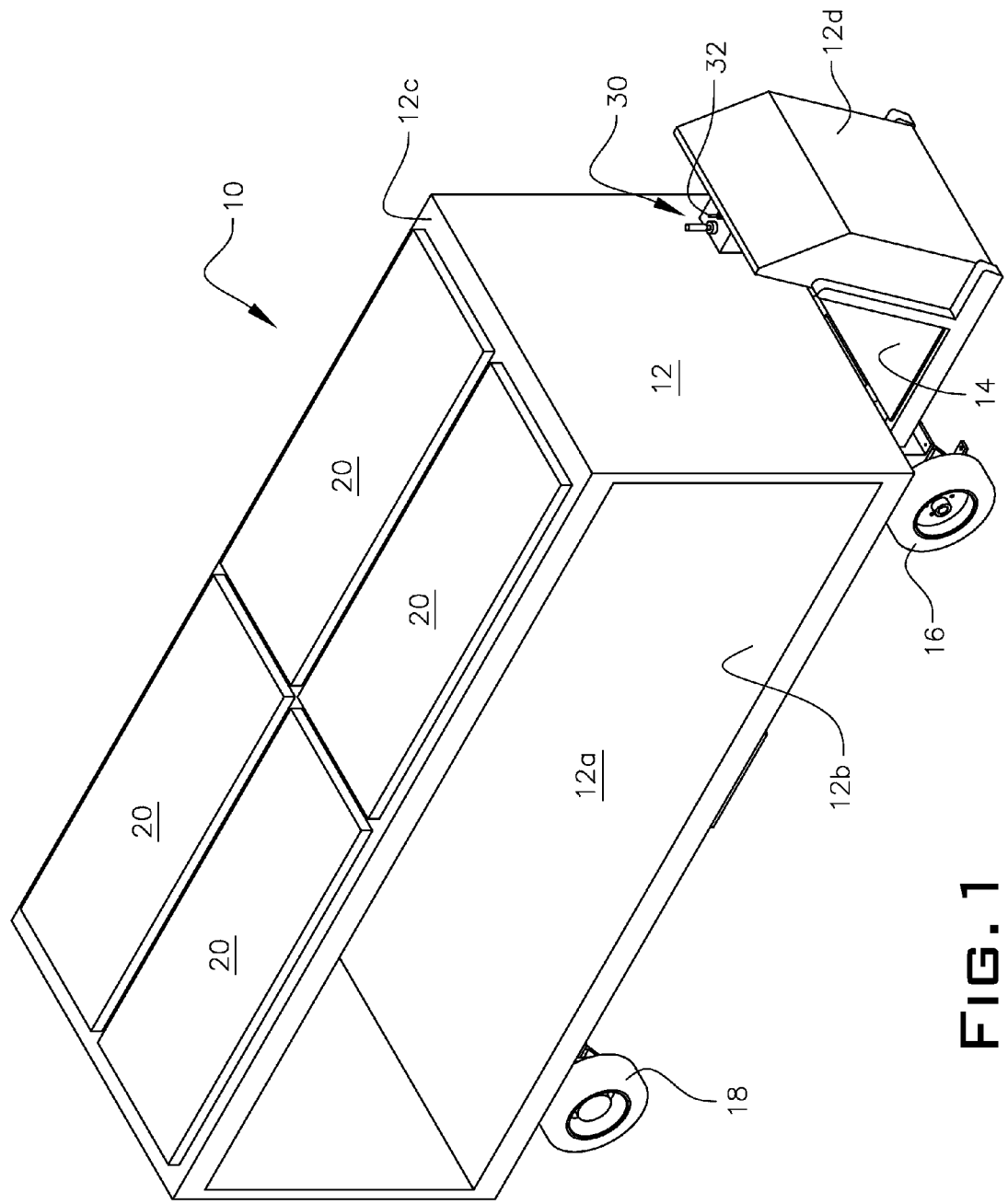
FIG. 1 is a perspective conceptual view of the present invention.

Referring now to the drawings, FIGS. 1-3, 4A-4C and 5 disclose various examples of the present invention, which is a solar powered baggage cart, depicted generally as 10.

Generally, the invention is a solar powered baggage cart 10 that includes a baggage cart 12 comprising a baggage container portion 12*a* having a generally flat bottom surface 12*b* for placing baggage thereon, a generally flat top surface 12c vertically spaced-apart from the bottom surface 12b.

The baggage cart 12 further comprises a platform 14 extending from one end side of the baggage container 12. The platform 14 is dimensioned to allow a cart operator to stand on a top surface of the platform 14. A pair of spaced-apart front wheels 16 and a pair of spaced-apart rear wheels 18 underlie the baggage cart 12 for supporting the baggage cart 12 in rolling motion on a supporting surface.

An array of photo-voltaic cells 20 located in an overlying relationship to the generally flat top surface 12c, with the cells 20 being in electrical communication with a bank of batteries 22 through a charging control circuit 24 for charging the bank of batteries 22. The bank of batteries 22 are preferably mounted under the baggage cart 12 and electrically connected to one or more electric motor/pumps 26, which are in mechanical communication with respective drive motors and brakes 28 for said front and rear wheels 16,18.

The solar powered baggage cart 10 further comprises means 30 for driving and steering said baggage cart 12, where the means 30 for driving and steering said baggage cart 12 is incorporated into an upright panel 12d extending from the platform 14 and being in electrical communication through a programmable control circuit 34 with the one or more electric motor/pumps 26. The means 30 for driving and steering the baggage cart 12 is preferably in the form of a joystick.

Figure 2:
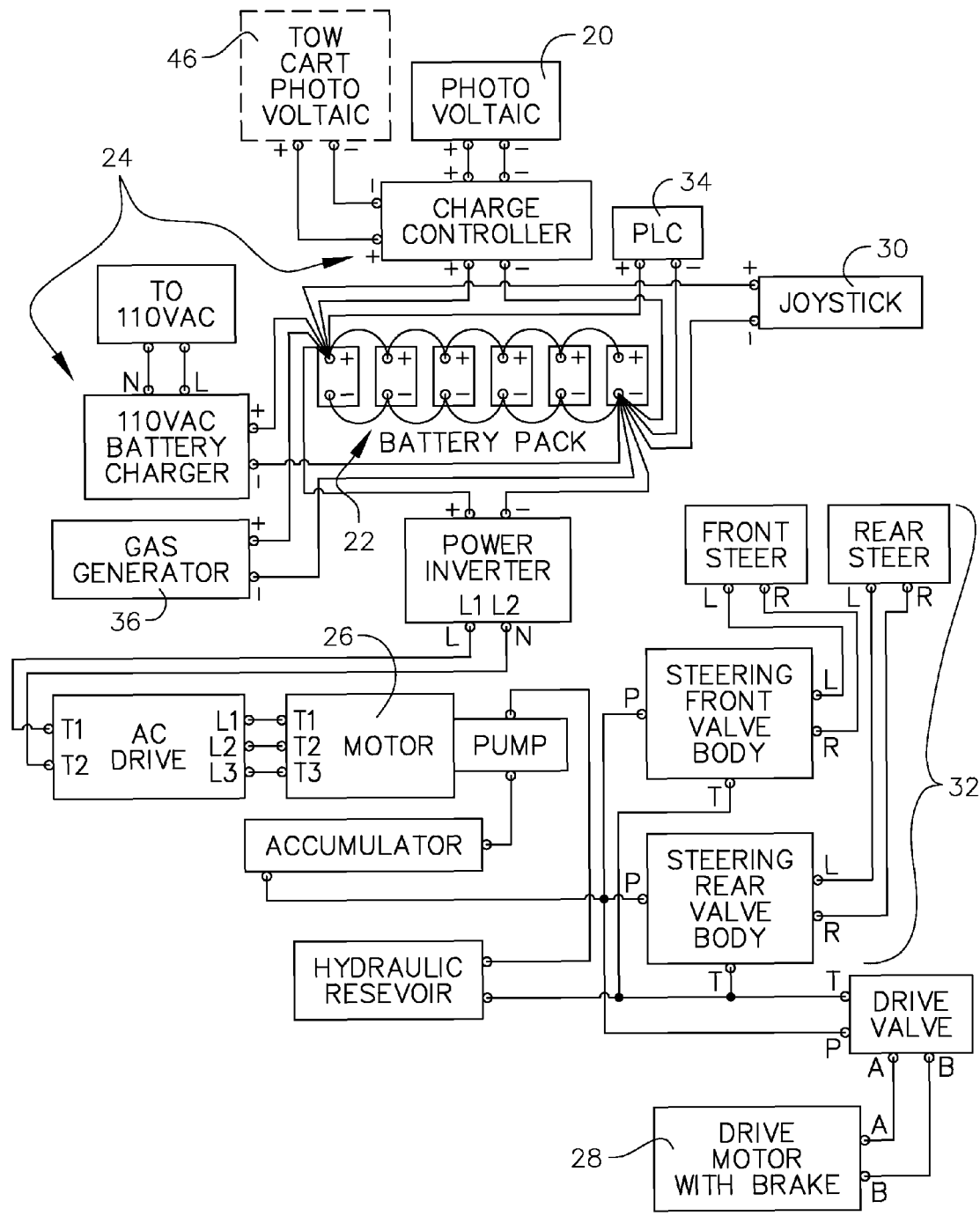
FIG. 2 is an example of a system schematic showing some of the typical components for the present invention.
Figure 3:
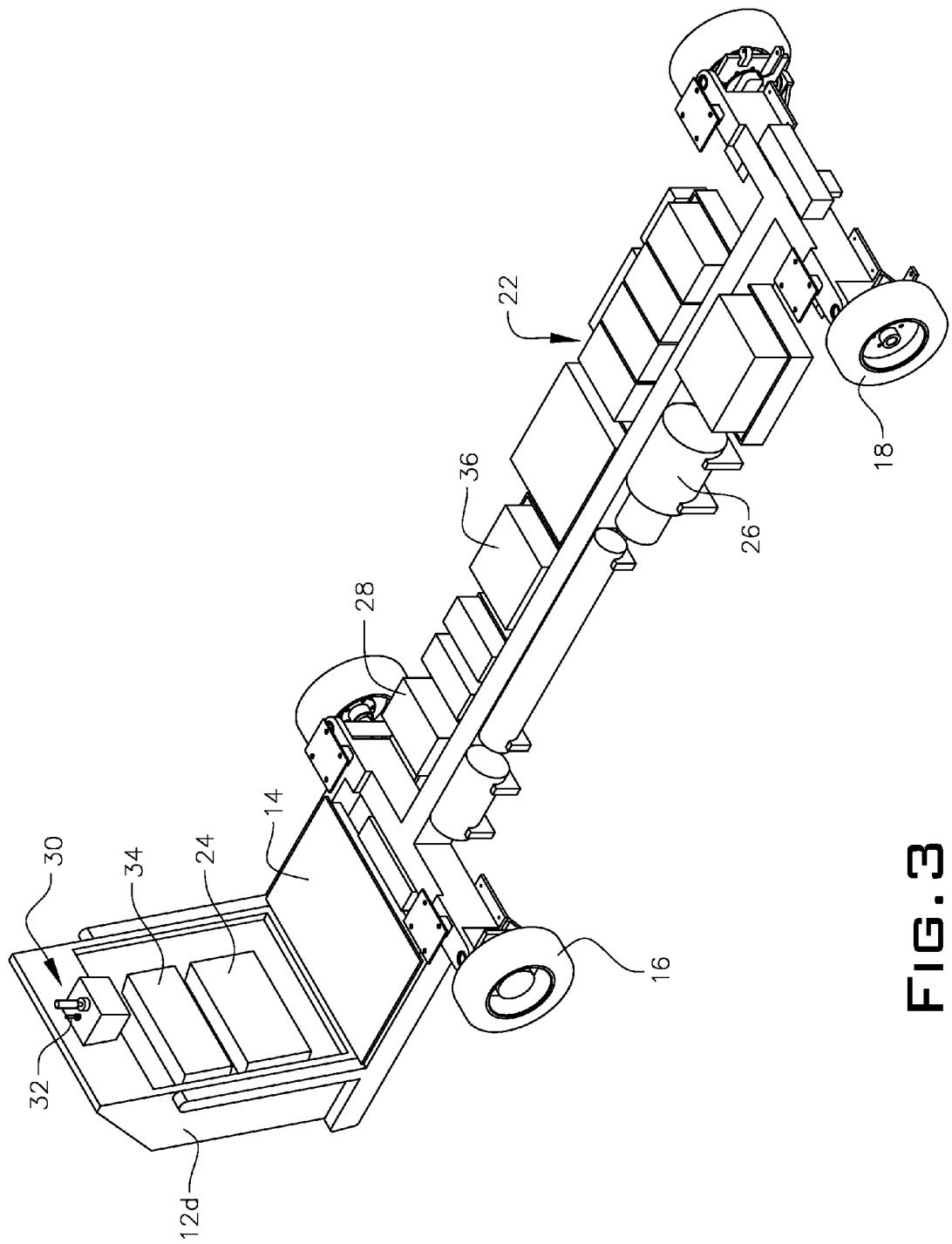
FIG. 3 is an example of an arrangement of some of the components noted in FIG. 2 underlying the cart container box.

As shown schematically in FIGS. 2 and 3, the solar powered baggage cart 10 further comprises means 32 for selectively driving the baggage cart 12 in a front wheel steer mode 32a, in a rear wheel assist steer mode 32b or in a crab steer mode 32c. The front wheels 16 and rear wheels 18 are rotatable up to −45 degrees to +45 degrees from center as representational depicted in FIGS. 4A-4C.

The solar powered baggage cart 10 may optionally be configured to include backup means 24 for charging the bank of batteries through a 110 v A/C outlet and/or a gas operated generator system 36 as an alternative backup means for charging the bank of batteries 22.

As depicted in FIG. 5, the solar powered baggage cart 10 may also be modified with a hitch coupling assembly 38 as means for towing a tow baggage cart 40 behind the solar powered baggage cart 10. The tow baggage cart 40 typically comprises a tow baggage container portion 40a with a generally flat top surface 40b vertically spaced-apart from a bottom surface 40c of the tow baggage cart 40. A pair of spaced-apart front wheels 42 and a pair of spaced-apart rear wheels 44 underlie the tow baggage cart 40 for supporting the tow baggage cart 40 in rolling motion on a supporting surface. An array of photo-voltaic cells 46 are located in an overlying relationship to the generally flat top surface 40b on the tow baggage cart 40. The cells 46 are in electrical communication with a bank of batteries 22 underlying the lead solar powered baggage cart 10 through the charging control circuit 24 for charging the bank of batteries 22.

The present invention is an electrically powered motorized baggage cart. Electricity to power the cart is drawn from a storage battery bank and electricity to charge the battery bank is generated from photo voltaic cells positioned on the roof of one or more carts and/or a gasoline engine that drives a generator to charge the battery bank. Additionally a 110 v A/C connection is provided to charge the batteries from standard 110 v A/C current.

FIG. 2 depicts one example in the form of a system schematic representation of some of the typical components that comprise the present invention. For example, although a single 5 HP motor/pump is shown, multiple pumps may be used instead to obtain a desired horsepower rating. Similarly, the showing of six batteries is only shown as an example and the number of batteries comprising the battery bank 22 may vary based on the design of the cart and the power needed to drive the cart.

A driving station is constructed on the front of the cart from which steering, forward and reverse movements and braking are executed. The operator stands in the driving station, for example, on a platform between the cart and the control/driving mechanism, and executes all maneuvering functions via a driving handle, preferably in the form of a joystick.

The driving platform 14 is high enough that a person of average height can see over the top of the baggage box for reverse steering. A clevis hitch 38 is preferably mounted on the rear of the cart so that one additional cart can be pulled along. Photo voltaic cells 20 are positioned in an overlying relationship to the roof 12c of the baggage box (baggage container 12) which provide electricity for the operation of the cart.

The vehicle is preferably designed to travel at a maximum speed of 5 miles per hour which is the speed limit within a few hundred feet of a parked aircraft.

There are three steering modes that are selected by a toggle switch (Steering Option Switch) on the console, next to or incorporated into the joystick control means 30. FIGS. 4A-4C are representational schematics showing the various steering modes. Steering positioning device 32 depicted in the Figures as 32 as a separate switch, may be incorporated in the Joystick steering device itself.

1) Two wheel steering 32a. When the Steering Option Switch is in the center position, the two rear wheels 18 stay aligned fore and aft and only the front two wheels 16 rotate (typically up to 45 degrees) to provide directional control.

2) When the Steering Option Switch is moved to the left, rear wheel assist option 32b becomes engaged. The rear wheels 18 then turns in the opposite direction of the front wheels 16 enabling the vehicle to turn a 360 degree circle in its own length.

3) When the Steering Option Switch is moved to the right, crab steering 32c is enabled. Crab steering turns all wheels 16,18 to a 45 degree angle pointing in the direction that the joy stick is moved. The purpose of crab steering is to allow the cart to be moved sideways at a 45 degree angle to approach conveyors.

The steering is unique in that the wheels mimic the exact position of the joystick means 30. If the joystick 30 is moved 20 degrees to the right the steered wheels move only 20 degrees. When the joystick is returned to the center position the steered wheels align to straight ahead for forward/back movement.

The steering mode will not change until the joystick 30 is returned to center, even if a different option is selected on the Steering Option switch, the new option will not engage until the joystick is returned to center.

How it Works:

In one typical example of components that may be used to assemble the invention, the steering of the wheels is accomplished with a hydraulic double rod cylinder on each of the two axles. Each cylinder has a linear potentiometer attached to the cylinder piston end. The software that interprets the joystick position opens a right or left steering valve until the voltage from the linear potentiometer matches that of the joystick at which point the valve is closed. The joystick is configured to use an "X" and "Y" coordinate. Where "X" is for forward and reverse and "Y" is for right and left. A variable voltage signal of 0 to 5 volts DC is generated from full left (zero) to full right (five volts) with 2.5 volts in the center position or null. If the steering controller sees a voltage of from 0 to 2.4 volts it adjusts the wheels to the left, 2.6 to 5 volts it adjusts the wheels incrementally to the right.

Propulsion:

Propulsion is achieved by running one or more electric motors that turn hydraulic gear pumps that in turn pressurize an accumulator tank and the various valve bodies for steering and forward and reverse.

Typically the pump motors are 220 volt 3 phase asynchronous motors. Voltage inverters are used to convert the DC power from the battery bank to 220 volt single phase electricity. This electromotive force feeds "Variable Speed Frequency Drives" that accept 220 Volts single phase A/C and convert it to variable frequency (0 to 100 Hertz) 3 phase power. The motor pumps run at a constant RPM until a maximum accumulator pressure is reached and then shut down, or when a command is initialized to move forward or reverse by moving the joystick, at which time the pumps start running to provide motive power.

The above is merely one example of the typical components and operating parameters that can be used to assemble the invention. Certainly, it is understood that one skilled in the art may vary the components and there arrangements, while maintaining the functional abilities of the cart. Single to multiple electric motors may be used. A single hydraulic oil reservoir is sufficient to facilitate the on-demand turning of the wheels in the desired direction. The means of mechanically communicating the driving mechanism and the braking system to the wheels can be done in a number of ways known in the art and the means to transfer energy and charge the batteries is also known in the art.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A solar powered baggage cart comprising:
   a baggage cart comprising a baggage container portion having a generally flat bottom surface for placing baggage thereon, a generally flat top surface vertically spaced-apart from said bottom surface;
   said baggage cart further comprising a platform extending on one end side of said baggage container, said platform being dimensioned to allow a cart operator to stand on a top surface of said platform;
   a pair of spaced-apart front wheels and a pair of spaced-apart rear wheels underlying said baggage cart for supporting said baggage cart in rolling motion on a supporting surface;
   an array of photo-voltaic cells located in an overlying relationship to said generally flat top surface, said cells being in electrical communication with a bank of batteries through a charging control circuit for charging said bank of batteries; and
   said bank of batteries being mounted under said baggage cart and electrically connected to one or more electric motor/pumps, said one or more electric motor/pumps being in mechanical communication with respective drive motors and brakes for said front and rear wheels, wherein the one or more electric motor/pumps drive a hydraulic gear pump system that pressurizes an accumulator that maintains a stored energy operating constant pressure for driving the respective drive motors and brakes, and to provide a maximum flow of hydraulic fluid to the respective drive motors and brakes to achieve cart speeds up to a maximum of 5 miles per hour.

2. The solar powered baggage cart according to claim 1, further comprising:
   means for driving and steering said baggage cart, said means for driving and steering said baggage cart being incorporated into an upright panel extending from said platform and being in electrical communication through a programmable control circuit with said one or more electric motor/pumps.

3. The solar powered baggage cart according to claim 2, wherein said means for driving and steering said baggage cart is in the form of a joystick, the joystick mimics travel direction and is controlled so that when the joystick is released, the pair of spaced-apart front wheels and the pair of spaced-apart rear wheels return to a straight fore and aft position.

4. The solar powered baggage cart according to claim 1, further comprising:
   means for selectively driving said baggage cart in a front wheel steer mode, in a rear wheel assist steer mode or in a crab steer mode.

5. The solar powered baggage cart according to claim 1, wherein said front and rear wheels are rotatable up to −45 degrees to +45 degrees from center.

6. The solar powered baggage cart according to claim 1, further comprising:
   backup charging means for charging said bank of batteries through a 110 v A/C circuit.

7. The solar powered baggage cart according to claim 1, further comprising:
   a gas operated generator system for charging said bank of batteries.

8. The solar powered baggage cart according to claim 1, further comprising:
   a Clevis hitch coupling for towing a tow baggage cart behind said solar powered baggage cart.

9. The solar powered baggage cart according to claim 8, wherein said tow baggage cart comprises:
   a tow baggage container portion with a generally flat top surface vertically spaced-apart from said bottom surface;
   a pair of spaced-apart front wheels and a pair of spaced-apart rear wheels underlying said tow baggage cart for supporting said tow baggage cart in rolling motion on a supporting surface; and
   an array of photo-voltaic cells located in an overlying relationship to said generally flat top surface on said tow baggage cart, said cells having means for being in electrical communication with a bank of batteries underlying said solar powered baggage cart through said charging control circuit for charging said bank of batteries.

10. A baggage cart to be towed behind a solar powered baggage cart comprising:
    a tow baggage cart comprising a baggage container portion having a generally flat bottom surface for placing baggage thereon, a generally flat top surface vertically spaced-apart from said bottom surface;
    a pair of spaced-apart front wheels and a pair of spaced-apart rear wheels underlying said tow baggage cart for supporting said tow baggage cart in rolling motion on a supporting surface; and
    an array of photo-voltaic cells located in an overlying relationship to said generally flat top surface, said cells having means for being in electrical communication with a bank of batteries underlying a solar powered baggage cart through a charging control circuit for charging said bank of batteries, wherein said tow baggage cart is configured to be towed behind said solar powered baggage cart by being coupled using a Clevis hitch, wherein the solar powered baggage cart comprises:
- a baggage container portion having a generally flat bottom surface for placing baggage thereon, a generally flat top surface vertically spaced-apart from said bottom surface;
- a platform extending on one end side of said baggage container, said platform being dimensioned to allow a cart operator to stand on a top surface of said platform;
- a pair of spaced-apart front wheels and a pair of spaced-apart rear wheels underlying said combined baggage cart and platform;
- an array of photo-voltaic cells located in an overlying relationship to a top surface of said baggage container, said cells being in electrical communication with said bank of batteries through a charging control circuit for charging said bank of batteries; and
- said bank of batteries being mounted under said baggage cart and electrically connected to one or more electric motor/pumps, said one or more electric motor/pumps being in mechanical communication with respective drive motors and brakes for said front and rear wheels, wherein the one or more electric motor/pumps drive a hydraulic gear pump system that pressurizes an accumulator that maintains a stored energy operating constant pressure for driving the respective drive motors and brakes, and to provide a maximum flow of hydraulic fluid to the respective drive motors and brakes to achieve cart speeds up to a maximum of 5 miles per hour.

* * * * *